United States Patent [19]
Coats

[11] 3,822,778
[45] July 9, 1974

[54] LUMBER CAM LIFTING MECHANISM

[76] Inventor: Jesse C. Coats, P. O. Box 167, Horse Shoe Bend, Idaho 83629

[22] Filed: Jan. 27, 1971

[21] Appl. No.: 110,227

[52] U.S. Cl. .................. 198/103, 198/25, 198/45
[51] Int. Cl. .................. B65g 37/00, B15g 47/00
[58] Field of Search .......... 198/34, 25, 103, 185, 45

[56] References Cited
UNITED STATES PATENTS

| | | | |
|---|---|---|---|
| 1,263,515 | 4/1918 | Biehler et al. | 198/35 |
| 3,162,292 | 12/1964 | Lawson | 198/34 |
| 3,363,740 | 1/1968 | Hanbury | 198/34 |

*Primary Examiner*—Richard E. Aegerter
*Attorney, Agent, or Firm*—John W. Kraft

[57] ABSTRACT

The cam lifter feed mechanism of this invention comprises an inclined endless chain conveyor carried by an upper framework and a lower framework including a multiplicity of lug-like lumber engaging means mounted at intervals on the endless chains of the conveyor, a driven shaft journaled for roatation in the upper framework including sprockets operatively engaged with endless chains of the conveyor, a plurality of cam lifters mounted on the shaft at opposite terminal sides of the endless chain conveyor including outwardly projecting hook-like foot portions being operable to engage the lowermost terminal edge of lumber carried on the conveyor by the lug-like engaging means and to carry the lumber over the shaft to a point of discharge, a downwardly inclined discharge feed guide means mounted on the upper framework between cam lifters. The lower framework having a pair of opposing hopper forming downwardly inclined side frame members being operable to guide lumber toward the endless chain conveyor, means mounting the endless chain conveyor distally near the lowermost end of the downwardly inclined side frame member. The hook-like foot portions each have a leading edge downwardly inclined with respect to the radii of the cam lifter at an angle coincident with the angle of inclination of the endless chain conveyor, the foot portion issuing upwardly from the leading edge into a hook forming portion.

1 Claim, 5 Drawing Figures

FIG. I

JESSE C. COATS INVENTOR.

PATENTED JUL 9 1974 3,822,778

JESSE C. COATS INVENTOR.

BY *John W Kraft*

3,822,778

LUMBER CAM LIFTING MECHANISM

BACKGROUND OF THE INVENTION

1. Field of Invention

The present invention relates to lumber machine feed conveyors and more particularly to a lumber machine feed conveyor having a lumber cam lifting mechanism operable to pick up individual pieces of lumber separately and to convey or carry the lumber to a preselected point of discharge.

2. Brief Description of the Prior Art

Feed conveyors known in the art are generally used and employed to transfer separate pieces of lumber to saw machinery, planing mills, or the like. Since the time sequence between machine operation in a lumber mill are not at a uniform rate lumber may be collected at one point while awaiting a succeeding operating sequence. Notwithstanding, separate pieces of lumber only may be fed into the machinery. Machine feed conveyors generally used in the art comprise an inclined endless chain conveyor assembly including a plurality of pairs of parallel mounted lugs or guides carried by the opposing endless conveyor chains being operable to engage and to carry separate pieces of lumber upwardly on the conveyor, and a pair of disc-like cam lifter members usually having tooth-like slotted portions or lugs to engage the separate pieces of lumber on the conveyor and to carry it over the end of the conveyor to a point to feed a machine, the cam lifter members being mounted on the driven shaft of the conveyor at the opposite terminal sides of the conveyor. It is common practice to use a multiplicity of parallel conveyors together which are driven by a common shaft. However, lumber from saw and edging mills are not of uniform widths, cam lifters formerly known frequently cause a piece of lumber to be dislodged or "kicked out" away from the conveyor by reason of non-alignment of the cam lifter and a piece of lumber traveling on the conveyor with the result that a sequence operation in the associated mill machine is omitted.

Accordingly, it is an extremely important object of the present invention to provide means in a lumber machine feed conveyor to positively engage and to carry pieces of lumber at uniform intervals regardless of the width of the lumber.

A further object of the invention is to provide a hook-like foot on a cam lifter portion of a lumber machine feed conveyor; and to provide in a cam lifter a multiplicity of outwardly projecting hook-like foot portions each having a leading edge downwardly inclined with respect to the radii of the cam at an angle coincident with the angle of inclination of a conveyor portion, the foot issuing upwardly from the leading edge thereof into a hook forming portion.

Generally, the cam lifter feed mechanism of this invention comprises an inclined endless chain conveyor carried by an upper framework and a lower framework including a multiplicity of lug-like lumber engaging means mounted at intervals on the endless chains of the conveyor, a driven shaft journaled for rotation in the upper framework including sprockets operatively engaged with endless chains of the conveyor, a plurality of cam lifters mounted on the shaft at opposite terminal sides of the endless chain conveyor including outwardly projecting hook-like foot portions being operable to engage the lowermost terminal edge of lumber carried on the conveyor by the lug-like engaging means and to carry the lumber over the shaft to a point of discharge, a downwardly inclined discharge feed guide means mounted on the upper framework between cam lifters, the lower framework having a pair of opposing hopper forming downwardly inclined side frame members being operable to guide lumber toward the endless chain conveyor, means mounting the endless chain conveyor distally near the lowermost end of the downwardly inclined side frame members. The hook-like foot portions each have a leading edge downwardly inclined with respect to the radii of the cam lifter at an angle coincident with the angle of inclination of the endless chain conveyor, the foot portion issuing upwardly from the leading edge into a hook forming portion.

DETAILED DESCRIPTION OF THE PREFERRED EMBODIMENT

Figure 1:
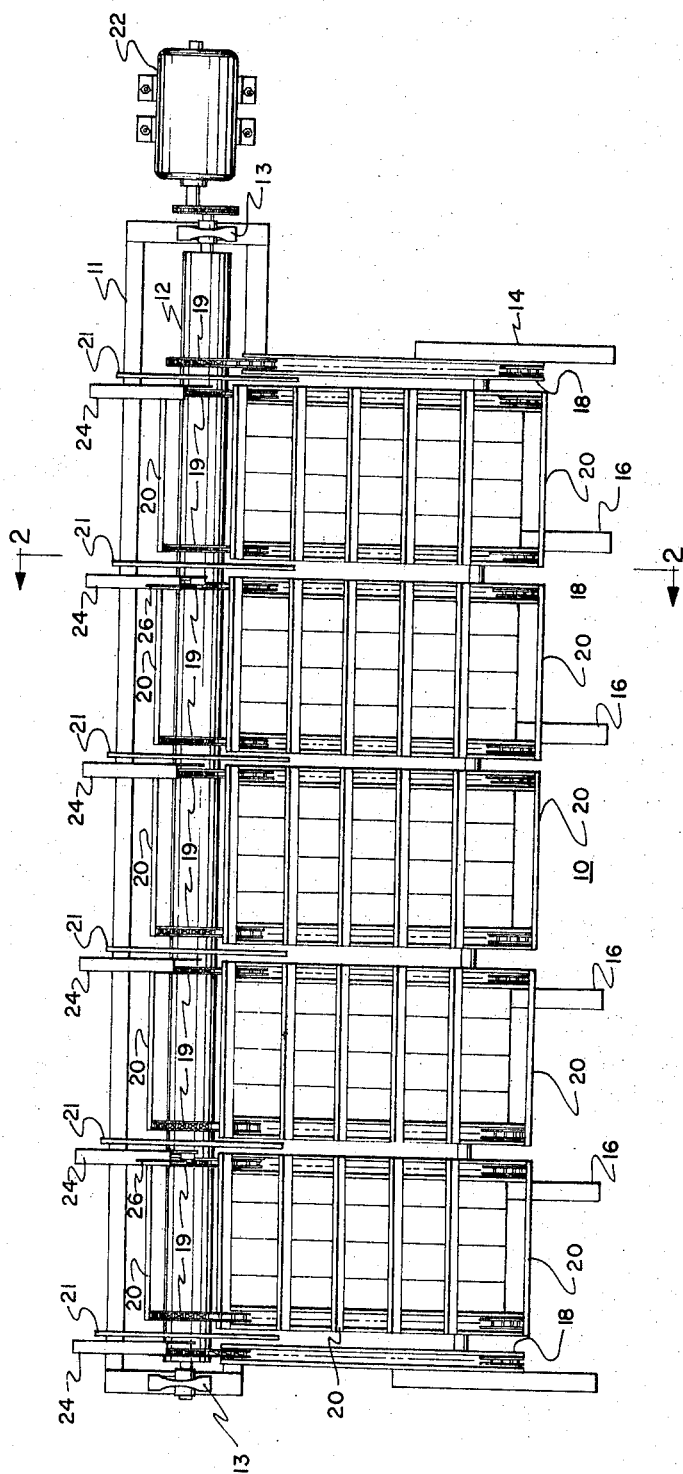
FIG. 1 is a front elevational view of the lumber cam lifter mechanism of this invention as viewed from the in-feed side of the mechanism looking toward the direction of travel of the mechanism.

Referring now to the drawings and more particularly to the plan view of FIG. 1 showing to advantage the lumber cam lifting mechanism of the present invention generally identified by the numeral 10. The mechanism 10 comprises an upper framework 11 having a driven shaft 12 journaled for rotation in bearings 13 mounted at opposite terminal sides of the upper framework 11, a lower framework 14 juxtapositioned downwardly from the framework 11 and including idler conveyor guide portion 15 more clearly shown in the FIG. 2 and hopper forming in-feed guide portions 16, upwardly inclined support tables 17 disposed between the upper framework 11 and the lower framework 14, a multiplicity of parallel endless conveyor assemblies 18 carried about sprockets 19 carried by the shaft 12, around idler conveyor guide portion 15 and over the support table 17, each of the endless conveyor assemblies including a multiplicity of equally spaced guide bars 20 disposed transversely to the direction of travel of the conveyor 18, a multiplicity of cam lifters 21 carried by the shaft 12 being disposed between respective conveyor assemblies 18 and support tables 17 and a driving source such as the motor 22.

Figure 2:
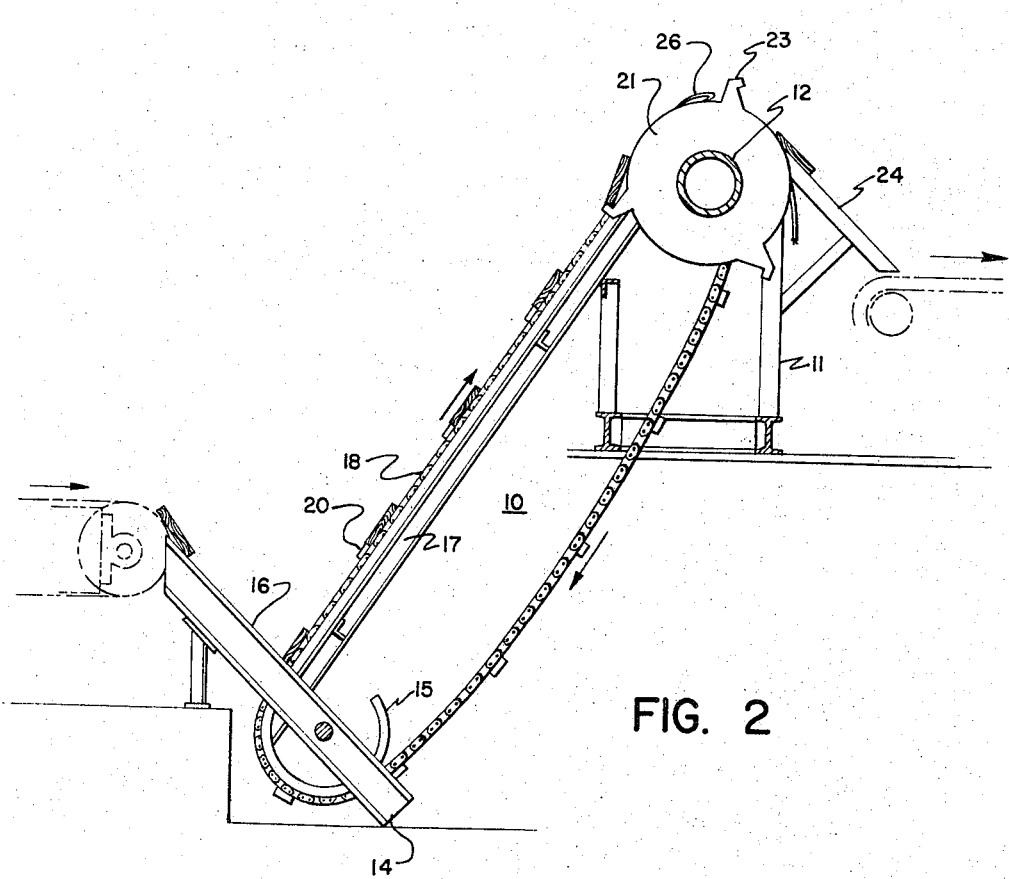
FIG. 2 is a side elevational view of the invention taken substantially along lines 2—2 of the FIG. 1 and showing the upper framework in cross sectional elevational view.

As shown to advantage in the FIG. 2 lumber is delivered to the in-feed guide 16 and caused to slide at an angle downwardly toward the conveyor assembly 18. A first guide bar 20 engages an edge of the lumber and tends to cause it to be lifted upwardly into the direction of travel of the first guide bar 20 and onto the inclined support tables 17. A succeeding guide bar 20 engages the opposite terminal edge of the lumber and carries it upwardly over the support tables 17. When the lumber is moved upwardly a cam foot of the cam lifter hereinafter more clearly described engages the lowermost terminal edge of lumber between respective conveyor assemblies 18 and support tables 17, and carries the lumber over the top of the lumber cam lifting assembly of this invention. It should be pointed out that without cam lifters 21 the guide bars 20 would tend to be disengaged from the terminal edge of the lumber as the bars 20 moved over the sprockets 19. Hence, the lumber would slide back down the inclined support table 17. It may also be pointed out that lumber scramble between the in-feed guide and the tables 17 tends to be unscrambled by the guide bars 20 and caused to be positioned on the conveyor. It may be observed in the FIG. 2 as it has been found in practice that although lumber on the conveyor may be of varying width the especial configuration of the lifter cams taught by this invention tends to cause each piece of lumber to be engaged at its lowermost terminal end regardless of its width.

Figure 3:
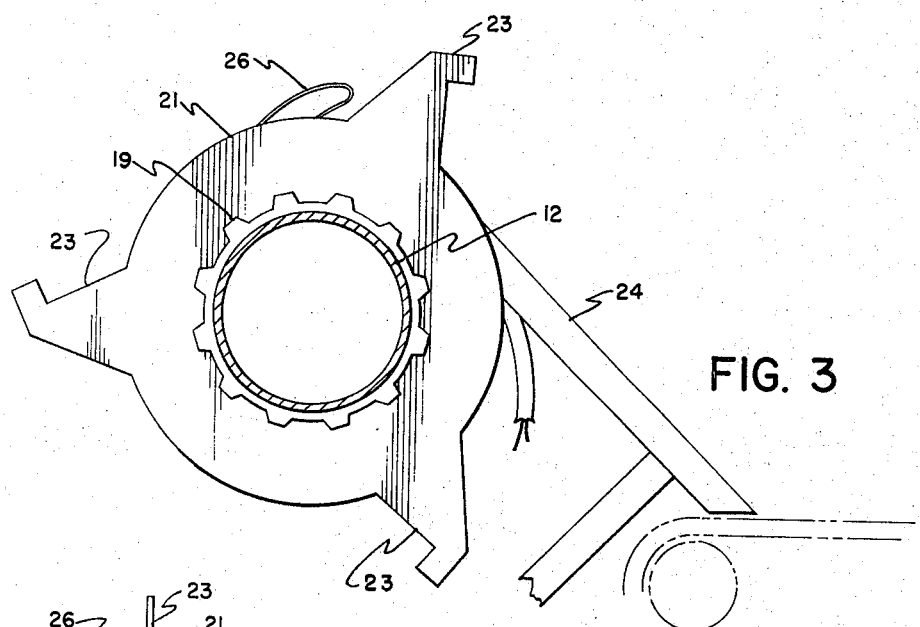
FIG. 3 is a side elevational view of one of the cam lifter elements of the invention drawn to a larger scale.
Figure 4:
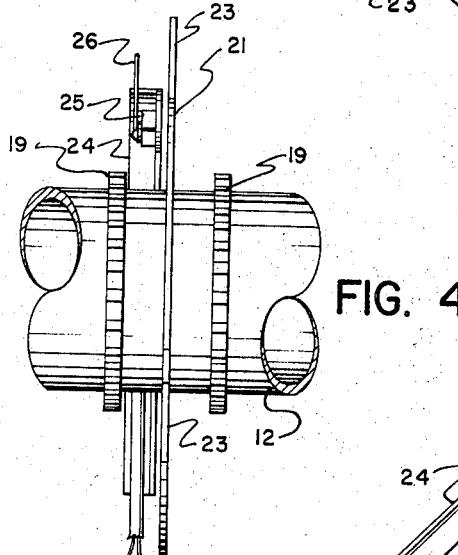
FIG. 4 is a fragmentary front elevational view showing one of the cam lifter elements of the invention.
Figure 5:
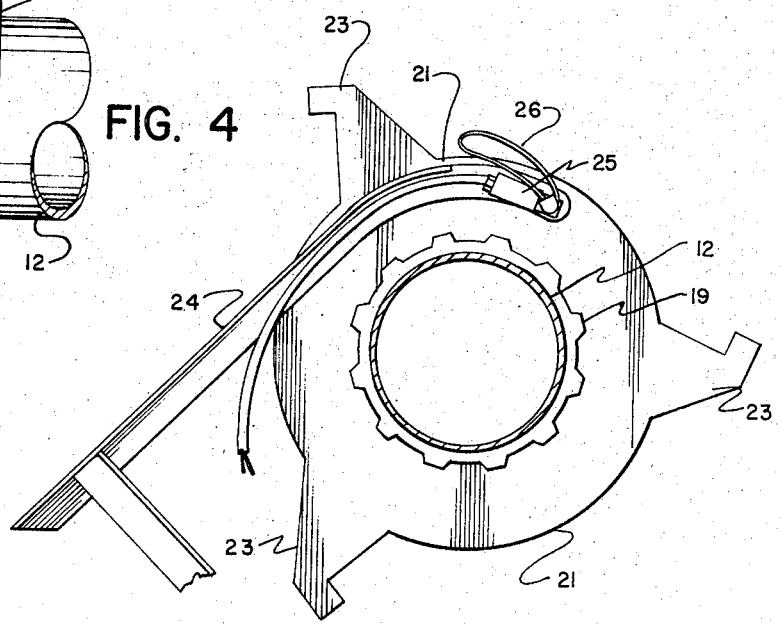
FIG. 5 is a side elevational view of a cam lifter element as viewed from the side opposite FIG. 3.

Referring now to the FIGS. 3, 4, and 5, the cam lifter assembly 21 on the shaft 12 is shown to advantage and is drawn to a larger scale. The cam lifter 21 of this invention is provided with a plurality of outwardly projecting hook-like foot portions 23. The hook-like foot portions 23 are disposed on the cam lifter 21 so that the portions 23 are coincident with uppermost portion guides 20 in the rotational movement of the cam lifter and the movement of the conveyor. The leading terminal edge of the foot portion 23 is downwardly inclined with respect to the radius of the lifter 21 so that the leading edge of the foot 23 is parallel with the angle of inclination of the conveyor table 17 at the point of engagement with a piece of lumber. As a piece of lumber is rotatably carried by the lifter 21, the upwardly issuing hook-like portion of the foot 23 tends to move over the terminal edge to grasp the lumber. Each of the cam lifters 21 is provided with a respective downwardly inclined discharge guide 24 which are connected to the upper framework 11 and are juxtapositioned adjacent each of the cam lifters 21. As lumber is carried over the upper framework 11 by the cam lifters 21, the lumber is caused to be discharged onto the guides 24 and caused to move by gravity down the guides 24. An electrical switch 25 having an upwardly projecting operating arm 26 may be provided and mounted in each of the guides 25. The switch 25 is electrically connected to the motor 22. In operation lumber on the cam lifters 21 may engage the operating arms 26 to operate the switch 25 to stop the motor 22 and the rotation of the operation of the assembly 10.

Having thus described in detail a preferred apparatus which embodies the concepts and principles of the invention and which accomplishes the various objects, purposes and aims thereof, it is to be appreciated and will be apparent to those skilled in the art, that many physical changes could be made in the apparatus without altering the inventive concepts and principles embodied therein. Hence, it is intended that the scope of the invention be limited only to the extent indicated in the appended claims.

I claim:

1. In a lumber cam lifter mechanism the combination of an inclined endless chain conveyor carried by an upper framework and a lower framework; said endless chain conveyor including a multiplicity of lug-like lumber engaging means mounted transversely at intervals on the endless chains of said conveyor, a driven shaft journaled for rotation in said upper framework, means driving said shaft, sprockets mounted on said shaft operatively engaging said endless chains of said conveyor, a plurality of cam lifters suitably fastened to said shaft on said conveyor, each of said cam lifters comprising a substantially round disc-like body portion mounted on said shaft and a plurality of outwardly projecting hook-like foot portions, each of said foot portions having a leading terminal edge downwardly inclined with respect to the radius of said body portion so that said leading edge is parallel with the angle of inclination of said conveyor, said foot portions of said respective cam lifters being aligned so that said foot portions are coincident with the uppermost portion of said lug-like lumber engaging means on said conveyor, said foot portions being operable to selectively engage the lowermost terminal edge of a piece of lumber carried on said conveyor by said lug-like engaging means and to carry said lumber on said cam lifters over said shaft to a point of discharge and to reject other pieces of lumber, the lower framework including a pair of opposing hopper forming, downwardly inclined side frame members being operable to guide lumber by gravity toward said conveyor, means mounting said conveyor distally from the lowermost end of said side frame members.

* * * * *